Sept. 26, 1939.　　　　　J. DUNN　　　　　2,174,204
LAWN MOWER SHARPENING MEANS
Filed Jan. 14, 1939　　　2 Sheets-Sheet 2
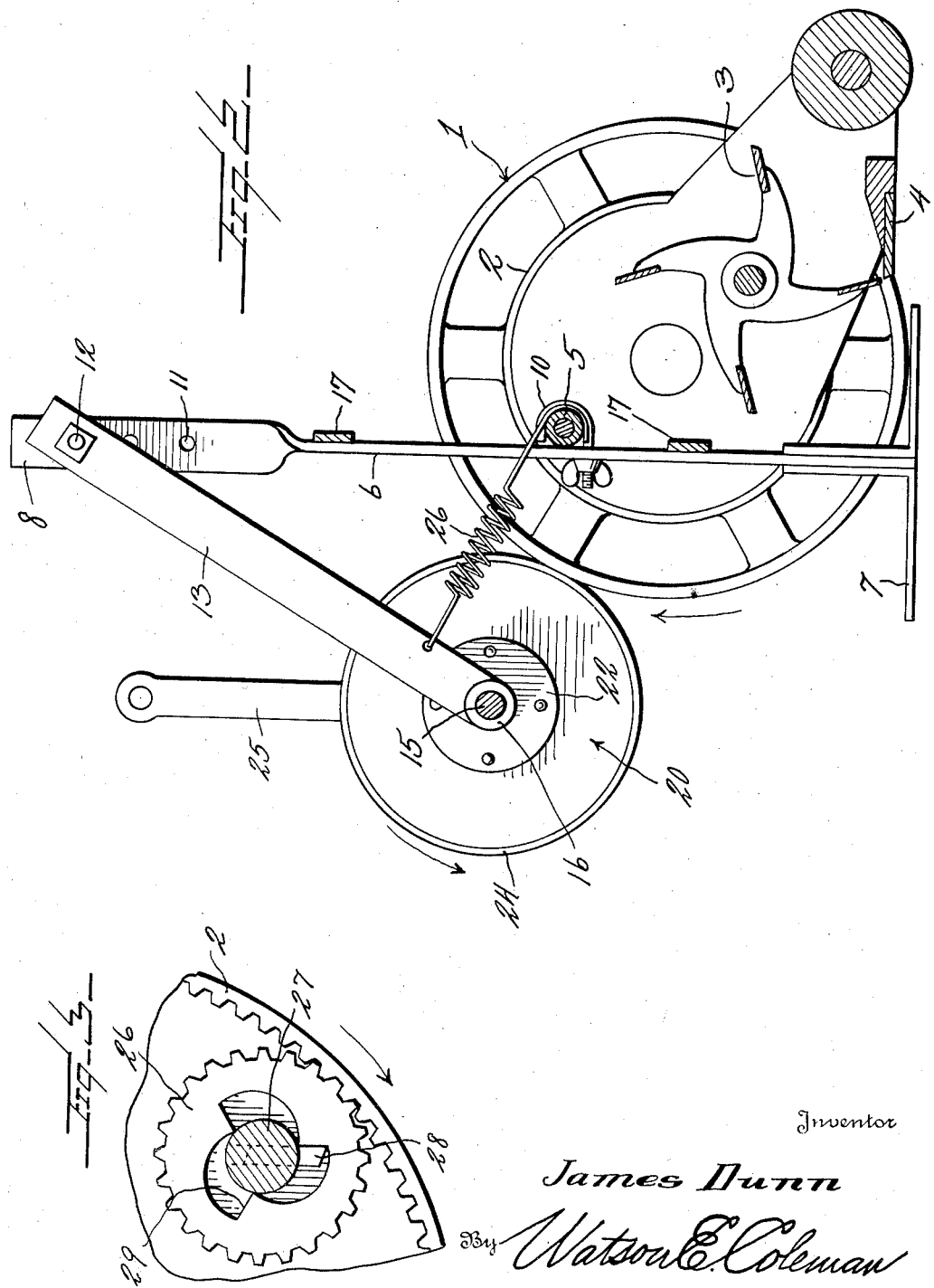
Inventor
James Dunn
By Watson E. Coleman
Attorney

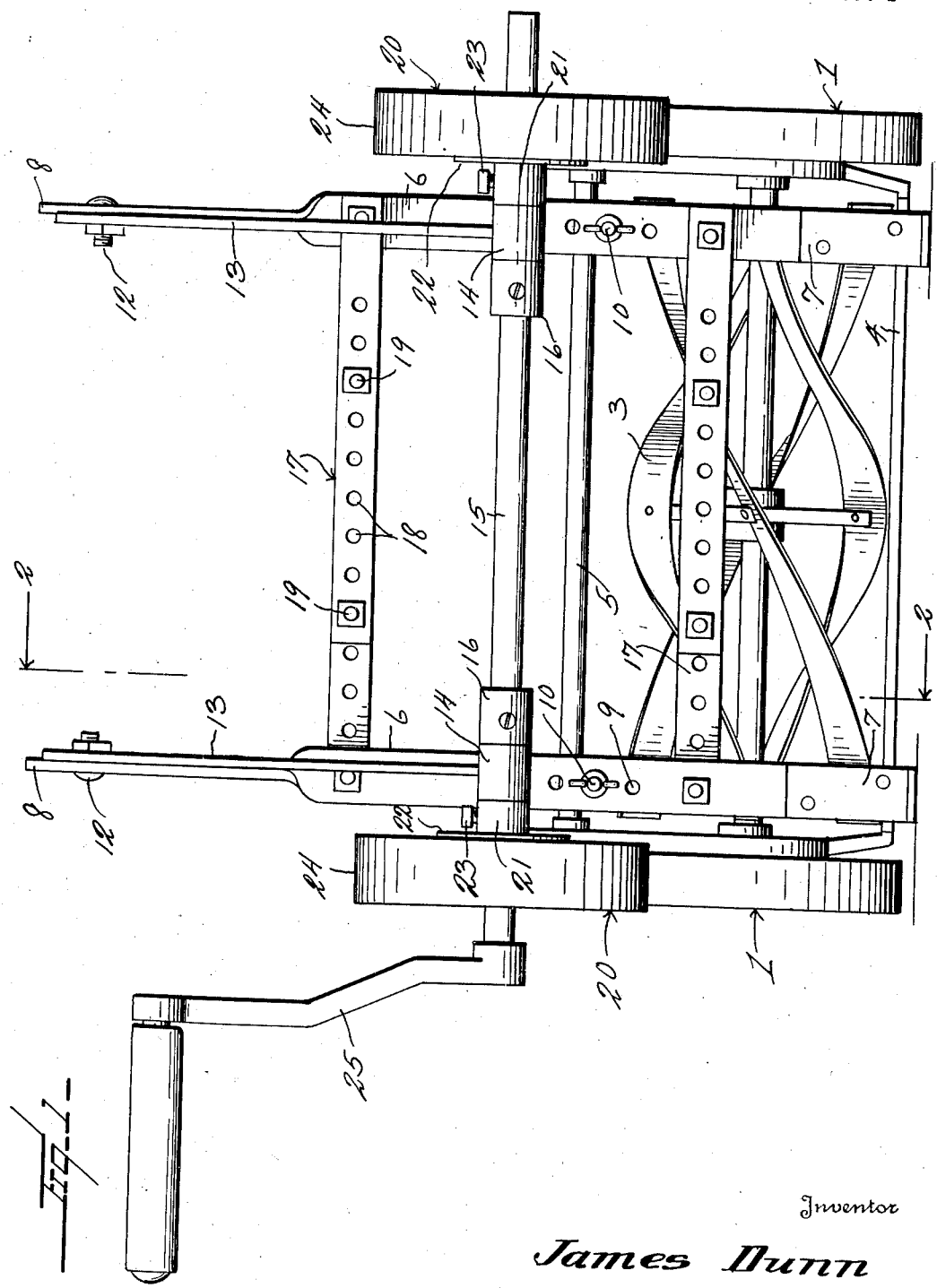

Patented Sept. 26, 1939

2,174,204

UNITED STATES PATENT OFFICE 2,174,204

LAWN MOWER SHARPENING MEANS

James Dunn, Bellflower, Ill.

Application January 14, 1939, Serial No. 251,002

3 Claims. (Cl. 51—26)

This invention relates to mechanisms for effecting the sharpening of lawn mowers and pertains particularly to such a mechanism which is designed to be attached directly to the mower for use.

The primary object of the present invention is to provide a novel and improved means whereby the cutting reel of a lawn mower may be reversely rotated to effect the passage of the blades over the cutter bar in the opposite direction to that in which the blades pass when cutting grass, the device employed for effecting this reverse rotation of the wheel being designed to be easily and quickly attached to the mower or detached therefrom.

Another object of the invention is to provide a device of the above described character which is of relatively simple construction but strong and durable and which may be inexpensively manufactured and easily operated.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Figure 1 is a view in front elevation of the device embodying the present invention, the same being shown applied to a mower.

Figure 2 is a sectional view on the line 2—2 of Figure 1.

Figure 3 illustrates a coupling between a wheel and the reel shaft in one form of mower, which coupling is reversed for the operation of the present device.

Referring now more particularly to the drawings wherein like numerals of reference designate corresponding parts throughout the several views, Figure 1 illustrates the application of the present device to a lawn mower. In this figure the mower structure is generally designated by the numeral 1 and comprises the usual ground engaging wheels 2 which are coupled in the well known manner through the medium of a ring and spur gear and pawl and ratchet mechanism with the shaft of the cutter reel which is indicated by the numeral 3. The cutter bar in association with which the reel blades operate is indicated at 4, while the usual brace or connecting bar between the housings for the wheels is indicated at 5.

The device embodying the present invention comprises the two standards each of which is indicated by the numeral 6, each standard having a supporting foot or base structure 7 whereby it will maintain a vertical position. The upper end of each of these standards 6 is twisted or turned so that a short upper portion 8 will be disposed in a plane at right angles to the side faces of the lower and major portion of the standard. These standards may be formed of any suitable material but it is preferred that they be made of steel of approximately one inch in width and three-eighths of an inch in thickness.

Substantially midway between the ends each standard is provided with a series of apertures 9 in which may be selectively engaged a hook bolt 10 which is employed for coupling the standards with the mower brace bar 5 in the manner illustrated whereby the mower wheels will be held suspended from the underlying floor surface. By providing the several holes 9 for each hook bolt, the device may be conveniently attached to mowers of different sizes.

Each of the turned or twisted upper end portions 8 is likewise provided with a number of apertures 11 and in one of these apertures of each standard there is engaged a pivot bolt 12 which passes through an end of an outwardly and downwardly extending bearing carrying arm 13. The outer end of each arm 13 is formed to provide a shaft bearing 14 and passing through and connecting these bearings is a shaft 15 upon which are secured the collars 16 which engage the inner ends of the bearings and maintain the shaft against endwise movement.

The standards 6 are coupled together by the horizontal connecting bars 17, each of which bars is in two parts and such parts are in overlapping relation and have a series of apertures 18 therethrough which are alined for the reception of coupling bolts 19. Thus the connecting bars 17 are extensible so that the device may be increased or decreased in length to fit it to different types of mowers.

Upon each end of the shaft 15 outwardly of the bearing adjacent thereto there is secured a friction wheel 20. Any suitable means may be employed for securing these wheels to the shaft but the means here shown consists of a sleeve or hub 21 which is formed integral with a plate 22 at one end which is secured by screws, bolts or the like to the adjacent wheel. A set screw 23 passes through each hub sleeve and engages the shaft 15 to secure the friction wheel thereon and against independent rotation.

These friction wheels may be made of wood or any other suitable material and if found desirable each may have a peripheral covering or tread of rubber material or material of any other suitable character, as indicated at 24, which will serve as a friction increasing means.

Adapted to be secured to either end of the shaft 15 is a crank 25 whereby the wheels may be rotated.

Each of the arms 13 has connected therewith adjacent its outer end, the contractile spring 26, the other end of which is adapted to be coupled with the mower brace bar 5 when the device is in operative position.

In the use of the present device, the standards 6 are set up between the mower wheels as illustrated, being separated as far as the space between the wheels will permit. This will bring the friction wheels 20 in position at the outer sides of the adjacent standards for frictional contact with the peripheries of the adjacent mower wheels 2. The hook bolts are coupled with the mower brace bar as illustrated and each of the springs has its free end coupled with this bar also, the springs being expanded or placed under tension when so connected so that they thus operate to draw the friction wheels in firmly against the mower wheels.

The sharpening operation for the reel blades is carried out by operating the reel in a direction opposite to that which it is rotated when the mower is in use for cutting grass. This brings the blades across the cutter bar from the rear instead of from the front. This has been found by experience to be the proper or most effective way of sharpening the blades. The sharpening of the blades is facilitated by the application to the edges thereof and to the edge of the cutter bar of a suitable paste of ground emery and oil. In order that the desired reverse rotation may be given to the cutter reel while rotating the shaft 15 from one end in a clockwise direction, it is necessary in one type of mower, which is known as the "Eclipse" mower, to shift the dogs for backward rotation and this is done by a thimble on the reel shaft. In all other makes of mowers the desired reverse rotation is obtained by removing the mower wheels and the small gears which are connected with the ring gears of the wheels and reversing or changing these small gears to the opposite sides and then replacing the wheels so that the drive or friction wheels of the applied device may contact the mower wheels and turn them in the desired direction.

Figure 3 illustrates the reversed position of a pawl and ratchet gear in a wheel 2, such gear being indicated by the numeral 26. The numeral 27 designates the shaft for the reel 3 in which is slidably mounted the transversely extending pawl 28 which engages the ratchet faces 29 of the ratchet gear. As will be readily understood, when the wheel 2 is reversely rotated it will turn in the direction indicated by the arrow and will give to the shaft 27 and the reel 3 a clockwise rotation as the reel is viewed in Figure 2, so that it will turn in reverse direction across the blade of the cutter bar 4 to sharpen the reel blades in the manner previously described.

From the foregoing it will be readily apparent that the device herein described is of simple construction but may be strongly and durably made and that it is easily and quickly applied or removed.

While the connecting bars between the standards have been shown and described as extensible so that the device may be applied to different types or sizes of mowers, it is, of course, to be understood that this structure may be made in the form of a rigid or non-extensible frame for one particular size or make of mower, if found desirable.

I claim:

1. A device for facilitating the sharpening of a lawn mower, comprising a frame unit designed to be disposed vertically between the wheels of a mower, supporting base means for the frame, means for coupling the mower with the frame in raised position with respect to the frame supporting surface, a pair of arm members each pivotally connected to said frame at one side thereof and extending outwardly and downwardly therefrom, friction wheels rotatably supported by said arms adjacent the outer sides of the arms, the arms swinging on the pivotal connections thereof to bring said wheels into peripheral engagement with the peripheries of the wheels of the mower, means for maintaining said friction wheels in firm contact with the mower wheels, and means for imparting rotary motion to the friction wheels.

2. A device for facilitating the sharpening of a lawn mower, comprising a frame unit designed to be disposed vertically between the wheels of a mower, supporting base means for the frame, means for coupling the mower with the frame in raised position with respect to the frame supporting surface, a pair of arm members each connected to said frame at one side thereof and extending outwardly and downwardly therefrom, a bearing carried by each arm, a shaft extending through and connecting the bearings and rotatable therein, a friction wheel mounted upon each end of the shaft at the outer side of the adjacent arm in position for contact with the periphery of the adjacent mower wheel, a spring connected with the outer end of each arm and adapted to be coupled with a fixed part of the attached mower, and means carried by said shaft for rotating the same and the friction wheels.

3. A device for facilitating the sharpening of a lawn mower, comprising a frame unit designed to be disposed between the wheels of a mower and including two vertically arranged bars, supporting base means for the frame, a pair of arms each pivotally secured at one end to a bar adjacent the upper end of the latter said arms both extending downwardly upon the same side of the frame, a shaft rotatably supported by said arms and connecting the same together, a pair of friction wheels supported by said shaft, means carried by said bars for securing the mower to the frame in raised position with respect to the frame supporting surface, the said arms oscillating upon their pivots to swing the side friction wheels toward the frame for contact with the wheels of a mower attached to the frame, means for drawing said friction wheels into firm contact with the mower wheels, and means for rotating the friction wheels.

JAMES DUNN.